United States Patent [19]

DeJong et al.

[11] Patent Number: 4,874,010
[45] Date of Patent: Oct. 17, 1989

[54] HEATER CONTROL VALVE

[75] Inventors: Allan W. DeJong; Paul D. Perry, both of Chatham, Canada

[73] Assignee: Siemens-Bendix Automotive Electronics Limited, Chatham, Canada

[21] Appl. No.: 199,216

[22] Filed: May 26, 1988

[51] Int. Cl.[4] .......................................... G05D 11/035
[52] U.S. Cl. .................. 137/484.4; 137/110; 137/625.29; 165/38
[58] Field of Search ............... 137/599.1, 117, 484.4, 137/625.29, 522, 523, 110; 165/38

[56] References Cited

U.S. PATENT DOCUMENTS

| | | | |
|---|---|---|---|
| 2,169,043 | 8/1939 | Goehring | 137/599.1 |
| 3,107,689 | 10/1963 | Schreiber et al. | 137/599.1 |
| 3,227,175 | 1/1966 | Remington et al. | 137/599.1 |
| 3,446,243 | 5/1969 | Haupt | 137/599.1 |
| 3,477,498 | 11/1969 | Caldwell | 165/38 |
| 3,685,542 | 8/1972 | Daughirda | 137/599.1 |
| 3,807,425 | 4/1974 | Boirum et al. | 137/599.1 |
| 3,868,991 | 3/1975 | Sheppard | 165/38 |
| 3,966,119 | 6/1976 | Harter et al. | 251/209 X |
| 4,064,693 | 12/1977 | Shibata | 137/522 X |
| 4,236,572 | 12/1980 | Turner et al. | 165/38 |
| 4,361,170 | 11/1982 | Peloza | 137/625.29 |

Primary Examiner—Stephen Hepperle
Attorney, Agent, or Firm—Russel C. Wells; George L. Boller

[57] ABSTRACT

A heater control valve comprising: a valve body defining a chamber and a bypass passage extending therefrom. A first conduit in fluid communication with the bypass passage for defining a first inlet port and a first exit port adapted to communicate coolant to an external device. A second conduit, in communication with the chamber defining a second inlet adapted to receive flow from the external device and a second outlet. The valve body further including a first seating surface disposed about an upstream end of the bypass passage and a second seating surface disposed about the second inlet, and a bypass valve, rotatable from a first position in sealing engagement with the first seating surface to a second position in sealing engagement with the second seating surface, and an actuator, for rotating the bypass valve from the first position to the second position in response to control signals.

20 Claims, 3 Drawing Sheets

HEATER CONTROL VALVE

BACKGROUND AND SUMMARY OF THE INVENTION

The present invention relates generally to flow control valves and more particularly to a flow control valve which regulates coolant flow to a heater core.

Heater cores such as those used in automotive vehicles receive hot coolant from the engine. The rate of coolant flow is proportional to engine speed (rpm). It is known that over the life of a vehicle the coolant may be contaminated with particles of grit, rust, etc. which also flow through the core. In order to increase the useful life of the heater core and protect it, it is necessary to limit the flow rate of the coolant through the heater core to reduce erosion due to the impact of the particles with portions of the core. Further, during the useful life of the heater core sediment within the coolant may accumulate on the various internal passages of the heater core which tends to restrict the flow of coolant therethrough. Consequently, as the heater core ages the pressure drop across the core increases. It is also useful to limit the maximum flow rate of coolant through the heater core to maintain the pressure within the core at reasonable levels otherwise the core may flex, leak or fatigue prematurely. It has been found that if the flow rate of coolant is restricted to approximately 5-6 gallons/minute (19-23 liters per minute) heater core useful life can be increased. The above relationship has been appreciated for some time. Current heating systems utilize a rubber orifice flow control washer. This device provides a restriction at all flow rates. As the flow pressure increases the rubber compresses causing the flow area (orifice diameter) to decrease thus limiting the flow to the required amount. While the rubber orifice functions to limit the maximum flow rate of coolant, it also provides a significant restriction to the flow of coolant at lower engine rpm thus restricting the amount of coolant communicated to the heater and reducing its performance.

It is an object of the present invention to provide a flow control valve for a heater core which maximizes flow at low engine rpm and which limits coolant flow to approximately 6 gallons per minute at high engine rpm. Another object of the present invention is to controllably terminate coolant flow to the heater core under certain conditions such as when maximum air conditioning performance is required.

Accordingly, the invention comprises: a heater control valve comprising: a valve body defining a chamber and a bypass passage extending therefrom, first conduit means in fluid communication with the bypass passage for defining a first inlet port adapted to receive coolant and a first exit port adapted to communicate coolant to an external device such as a heater core, including flow diverter means to urge coolant to flow into the diverter passage. The control valve further comprising second conduit means, in communication with the chamber for defining a second inlet adapted to receive flow from the external device and a second outlet. The valve body further including a first seating surface disposed about an upstream end of the bypass passage and a second seating surface disposed about the second inlet. A bypass valve, is located in the valve body, rotatable from a first position in sealing engagement with the first seating surface to a second position in sealing engagement with the second seating surface and, includes a hinge pin extending from the valve body; and actuator means for rotating the hinge pin and bypass valve from the first position to the second position in response to control signals and for generating a bias force upon the bypass valve to maintain same in sealing engagement with the first seating surface below coolant flow rates less than a predetermined level wherein the bypass valve is permitted to rotate against the bias force, under the action of the fluid force generated by the diverted coolant to regulate coolant flow at the first outlet at the predetermined level.

Many other objects and purposes of the invention will be clear from the following detailed description of the drawings.

DETAILED DESCRIPTION OF THE DRAWINGS

Figure 1:
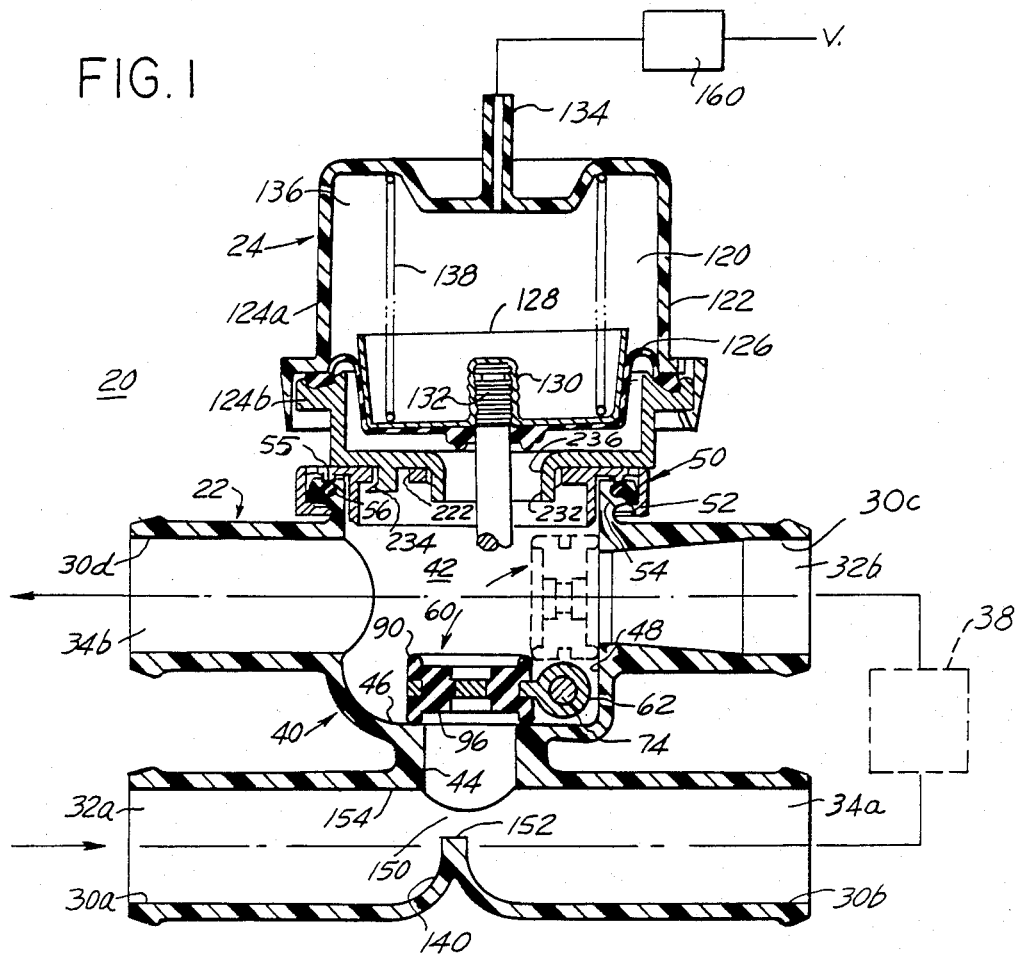
FIG. 1 is a cross-sectional view of one embodiment of a flow control valve constructed in accordance with the present invention and is taken along line 1-1 in FIG. 4.

With regard to FIGS. 1-4 there is illustrated a flow valve generally shown as 20. The flow valve 20 comprises a valve body 22 and an actuator assembly 24. Only a portion of the actuator assembly 24 is shown in FIG. 1 since it extends forward of the valve body (see FIG. 4). The valve body includes a plurality of tubes or conduits connected in an "H" configuration. Lower tubes 30a and 30b are connected to the upper tubes 30c and 30d via a bypass body section generally illustrated as 40. The bypass body section 40 includes a central cavity 42 in direct communication with the tubes 30c and 30d. The valve 20 further includes a cap 50 which comprises a generally rectangular first portion 52 which may be snap-fit about a shoulder 54 formed about the upper portion of the bypass body section to enclose the cavity 42. Appropriate sealing such as a rubber gasket or O-ring 56 may be used to enhance the seal. The O-ring 56 may be pressed by a bead 55. The cap 50 further includes a second portion 56 which extends from the first portion to cantilever mount the actuator assembly. The second portion includes a central opening 220, to receive a stem 110 of the actuator assembly, and a plurality of arcuate openings 222 positioned thereabout.

The bypass section further includes a bypass passage 44 in communication with tubes 30a and 30b. The lower portion of the chamber 42 proximate the bypass passage 44 defines a seating surface 46. Similarly the portion of the bypass body section proximate the innermost portion of tube 30c defines a second seating surface 48. The tubes 30a and b essentially form a single conduit forming at one end a first inlet 32a and at another end a first outlet 34a. Tubes 30c and 30d define another conduit having a second inlet 32b and outlet 34b. The inner diameter of tube 30c may be tapered from the second inlet 32b to the second seating surface 48.

Figure 7:
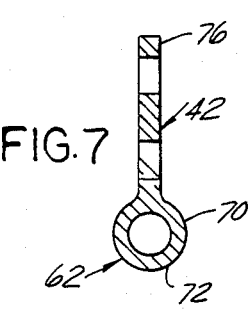
FIGS. 6 through 9 illustrate various views of a bypass valve used in the above flow valves.
Figure 6:
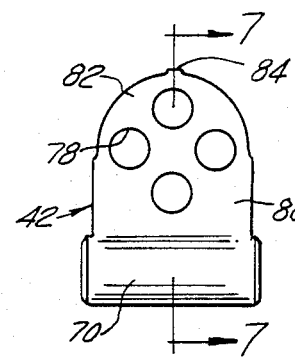

Rotatably secured within the bypass body section 40 is a bypass valve generally shown as 60. The bypass valve 60 includes a door hinge 62 (shown in greater detail in FIGS. 6 and 7) and the two rotate as a unit. As can be seen more clearly in FIGS. 6 and 7, the door hinge includes a cylindrical eyelet portion 70 defining an opening 72 for receipt of a hinge pin 74 (shown more clearly in FIGS. 1 and 4). Extending from the eyelet portion 70 is a relatively flat member 76 comprising a plurality of openings 78 the purpose of which will be described below. The flat member 76 comprises a generally rectangular portion 80 extending from the eyelet 70 and a generally semicircular portion 82. The diameter of the semicircular portion may be slightly less than the width of the rectangular portion 80. The semicircular portion 82 further includes at least one protuberance 84.

Figure 1A:
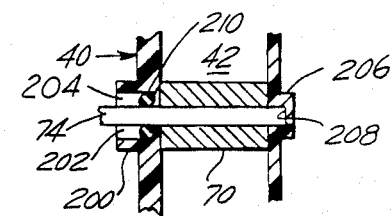
FIG. 1a illustrates a portion of the flow control valve.
Figure 2:
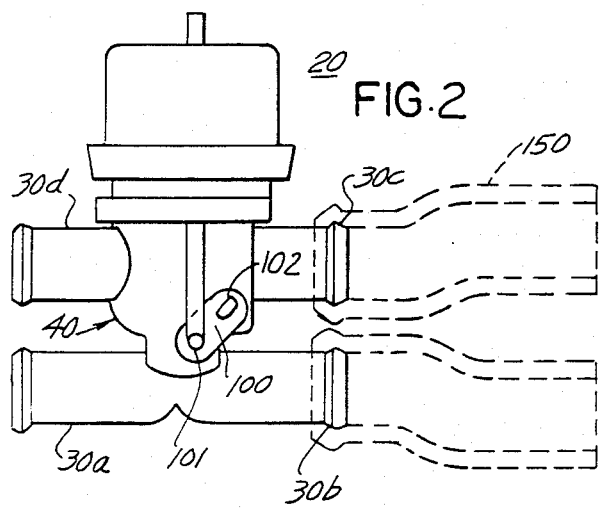
FIG. 2 illustrates a front elevational view of the flow valve.
Figure 4:
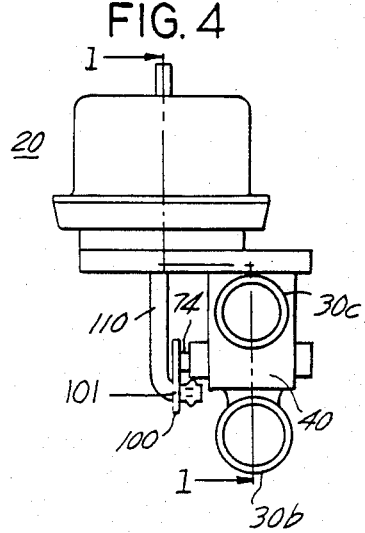
FIG. 4 illustrates a right side elevational view of the flow valve.

The bypass body section, as shown in FIG. 1a, includes a first cylindrical projection 200 defining a stepped bore 202 and opening 204. Positioned oppositely is a second cylindrical projection 206 defining a blind bore 208. During fabrication of the valve 20 the bypass valve 60 is inserted into the chamber 42 and aligned to the opening 204. The hinge pin 74 with an O-ring 210 is inserted into the stepped bore 208. The hinge pin 74 may include a serrated edge or similar connection means, which engages the eyelet 70.

Figure 9:
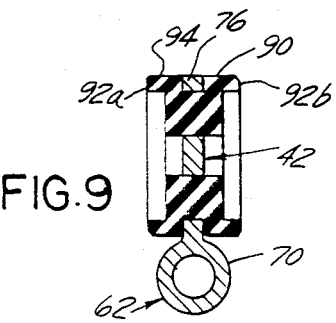
Figure 8:
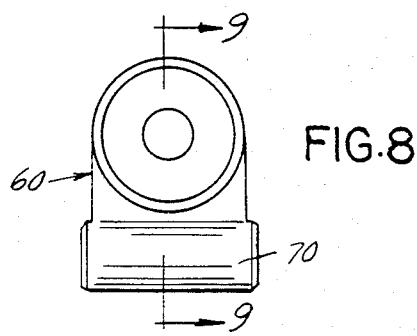

The bypass valve 60 further includes a resilient sealing member 90 shown in FIGS. 1, 8 and 9. The sealing member 90 includes oppositely extending annular sealing surfaces 92a and 92b. The sealing member 90 may be injection moulded to the door hinge 62 such that the resilient material fills the openings 78 thereby securing the resilient material thereto. As mentioned above, the sealing member 90 has a generally circular profile and it is desirable that the outer edge 94 of the member 90 be formed essentially tangential to the protuberance 84 of the door hinge 80.

The door hinge 62 is rotatable with the hinge pin 74 which extends through the bypass body section 40. Attached to one end of the hinge pin 74 is a bell crank lever 100. The bell crank lever may include an opening 102 of prescribed shape to receive a similarly formed end of the hinge pin 74. The bell crank lever 100 further includes another opening 101 to receive a portion of an actuator stem 110.

As mentioned above, the valve 20 includes an actuator assembly 24. As illustrated in the accompanying figures, the actuator assembly comprises a vacuum motor 120 comprising a multipart housing 122 (housing portions 124a and b) which secure therebetween a rolling diaphragm 126. The lower housing portion 124b is adapted to be supported by the cap 50. More particularly the lower housing portion 124b includes a flange and opening 232 received into the opening 220 of the cap 50. In addition the lower housing portion 124b includes a plurality of barbs 234 adapted to fit into the openings 222 thereby securing the actuator assembly 24 to the cap 50. While a vacuum motor 120 is shown it should be appreciated that electric actuators such as stepper motors or solenoids can be used to actuate the stem 110.

Attached to the upper side of the diaphragm is a cup-shaped piston 128 comprising a threaded bore 130 adapted to receive one end 132 of the stem 110.

The vacuum motor 120 further includes a vacuum inlet port 134 adapted to communicate vacuum to a chamber 136 partially defined by the diaphragm 126. A spring 138 biases the diaphragm 126 and stem 110 downwardly in a manner to urge the bypass valve 60 to seat upon the seating surface 46 as illustrated in FIG. 1.

With reference to FIG. 1, the valve 20 may further include an optional flow director 140 positioned within the flow passage defined by tubes 30a and 30b and located such that coolant received at the inlet 32a will be diverted upwardly into the bypass passage 44. As illustrated in FIG. 1 the diverter comprises an arcuately shaped portion of tubing, situated slightly left of center of the bypass passage 44, which extends perpendicular to the plane of the cross-section.

Figure 10:
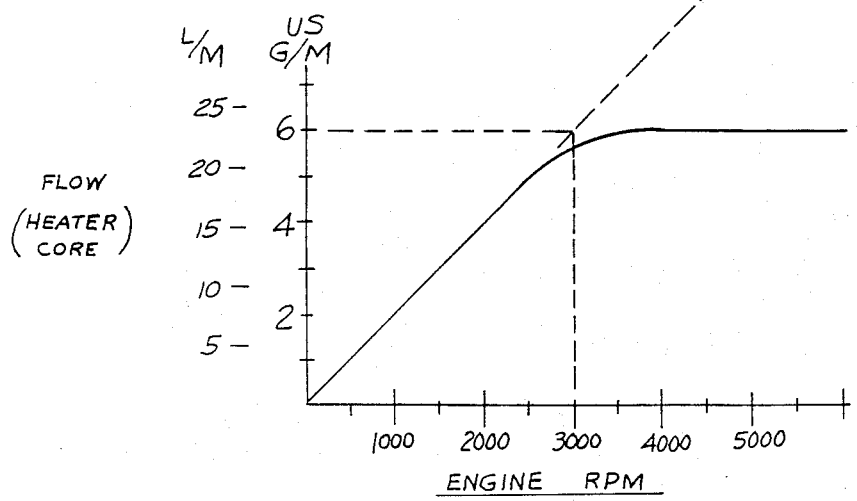
FIG. 10 illustrates a flow rate to the heater core vs rpm curve.
Figure 1B:
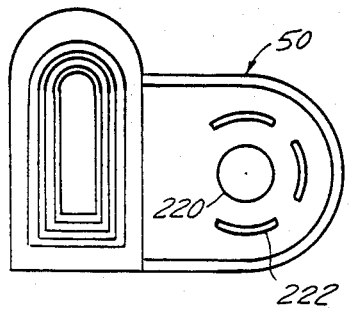
FIG. 1b issue a bottom view of a cap.

In operation coolant is pumped from the engine at a rate proportional to engine speed (see FIG. 10), and is received at the inlet 32a. Some of the coolant impacts the diverter and a portion of the flow is diverted upwardly into passage 44 and thereafter out of the exit end 34a of tube 30b into the heater core 38. The flow from the heater core returns to the valve 20 through the inlet 32b of tube 30c and exits the valve 20, at 34b, and is communicated to a radiator. Communication to the engine core and radiator may be affected by utilizing rubber hoses 150 such as those shown in FIGS. 2 and 3. Without vacuum applied to the port 134, the spring 138 biases the stem 110 downwardly in a manner to urge the valve 60 to close the bypass passage 44. As engine speed increases the rate of fluid flow will increase through tube 30a as will the upward force of that portion of the coolant diverted into the bypass passage 44. The spring 138 in the vacuum valve 120 and the effective length of the bell crank lever have been set to maintain the valve 60 in its closed position for flow rates below approximately 5 gallons per minute. As the engine speed increases the pressure exerted on the lower face 96 of the valve 60 will cause it to rotate clockwise, as seen in FIG. 1, against the bias force of the spring 30 thereby opening the bypass passage 44 regulating the coolant flow rate communicated to the core at approximately 5 to 6 gallons per minute. For many vehicles at maximum rpm, the engine will generate a coolant flow in the vacinity of 15 to 16 gallons per minute (see dotted line, FIG. 10). In operation the valve 20 will limit the flow to the core at less than 6 gallons per minute while bypassing, through the bypass passage 44, up to 10 gallons per minute.

At low engine rpm, that is, at engine rpm below the level that would cause the valve 60 to open, it is desirable that the valve 20 does not restrict the flow of fluid to the core 38. This is accomplished by sizing the flow area 150 between the top of the diverter 152 and sides 154 of tube 30a.

During engine operating conditions such as maximum air conditioning performance when it is desired to completely terminate flow through the heater core engine vacuum is supplied to the vacuum port 134 through a control unit such as to an electric vacuum controller 160 of known variety. The vacuum so communicated to the vacuum motor 120 causes the diaphragm 126 and stem 110 to move upwardly thereby rotating the lever 100 and valve 60 to seat against the sealing surface 48 thereby prohibiting flow through the core 38. In this mode of operation all of the engine coolant is diverted to the radiator through the bypass passage 44.

As mentioned above, the diverter 140 is optional and can be eliminated from tubes 30a and b. In this configuration the fluid pressure in tubes 30a and b will increase in proportion to flow due to the flow restriction of heater core. At a given flow rate fluid will be diverted into the bypass passage 44, to cause the diverter valve 60 to begin to open.

Figure 5:
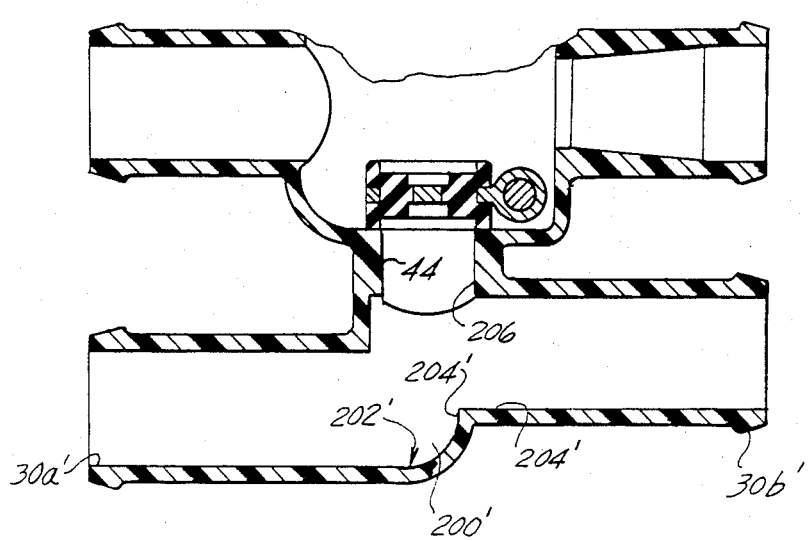
FIG. 5 illustrates an alternate embodiment of the present invention.
Figure 3:
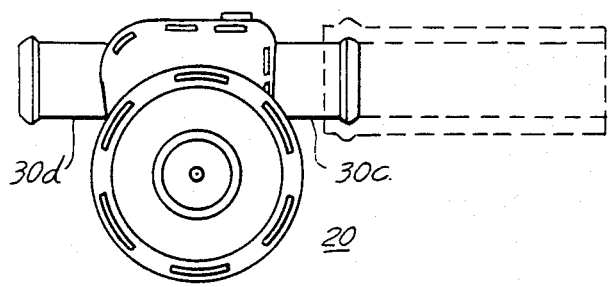
FIG. 3 illustrates a top elevational view of the flow valve.

FIG. 5 illustrates an alternate flow valve 20'. The valve 20' of FIG. 5 is identical to that described in FIG. 1 with the exception of the configuration of tubes 30'a and 30'b. More particularly, the center line of tube 30'a is located below the center line of tube 30'b such that the interior end 200 of tube 30'a may be formed with a continuous transition i.e. diverter 202' terminating the inlet of tube 30'b. The diverter 202' may comprise a quarter circle of tubing which terminates at a downstream point 204' slightly to the right of the downstream wall 206' of the bypass passage 44. This diverts the water flow to impact the door to cause it to open. This effect increases as flow increase to cause more bypass at high rpm and less restriction at low rpm.

Figure 11:
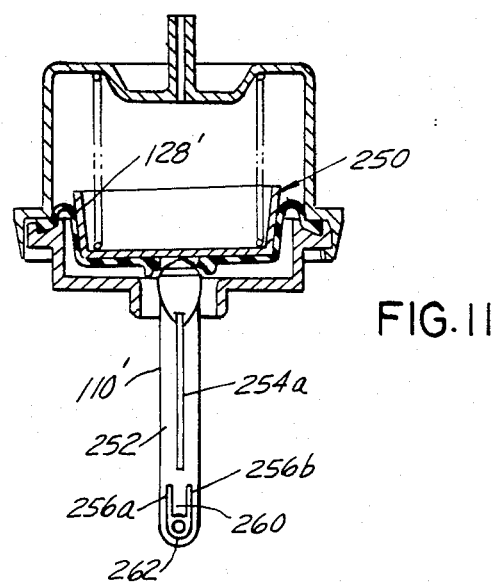
FIG. 11 and 11a illustrate an alternate embodiment of the invention.
Figure 11A:
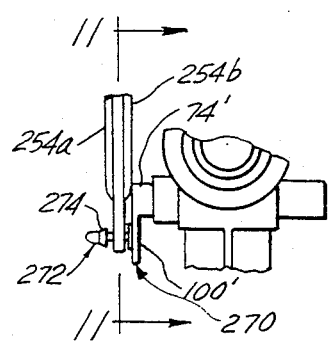

FIGS. 11 and 11a illustrate an alternate embodiment of the present invention. More particularly, the cup-shaped piston 128, having the threaded bore 130 to receive the stem 110, has been replaced by a single piece piston assembly 250. The piston assembly 250, preferably fabricated of plastic includes piston 128' and integrally attached stem 110'. The stem 110' includes a flat section 252 including axially extending ribs 254a,b to provide strength. The lower portion of the stem is bifurcated at 256a,b to define a flexible plastic member 260 and opening 262. FIG. 11a illustrates an alternate hinge pin and bell crank configuration shown as 270. In this configuration, the bell crank lever 110' and hinge pin are integrally formed. The crank lever 100' includes an outwardly extending pivot member or pin 272 which includes a barbed end 274. The barbed end 274 is adapted to be received within the opening 262 of the stem 110' and secured thereto by the flexible member 260.

Figure 12:
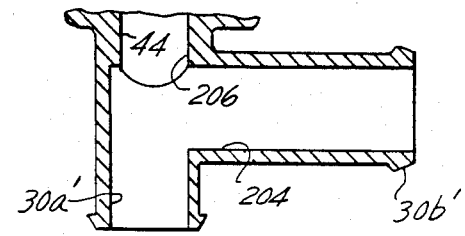
FIG. 12 illustrates still another embodiment of the invention.

FIG. 12 shows a partial cross-sectional view of the lower portion of the valve 20. As can be seen diverters such as 140 and 200 have been eliminated and the inlet 30a' substantially coaxially to the bypass passage 44. In operation coolant received at the inlet directly impacts the bypass valve 60 urging same off from its seat.

Many changes and modifications in the above described embodiment of the invention can, of course, be carried out without departing from the scope thereof. Accordingly, the scope is intended to be limited only by the scope of the appended claims.

I claim:

1. A fluid control valve comprising:
   a valve body defining a chamber and a bypass passage, for receiving fluid, extending therefrom,
   first conduit means, in fluid communication with the bypass passage, for defining a first inlet adapted to receive fluid and a first outlet adapted to communicate fluid to an external device;
   second conduit means, in communication with the chamber for defining a second inlet, adapted to receive flow from the external device, and a second outlet;
   the valve body further including a first seating surface, within the chamber, disposed about a downstream end of the bypass passage and a second seating surface disposed about the second inlet within the chamber;
   flow control means for regulating the flow rate of fluid, from the first inlet to the first outlet, to a maximum value, and for prohibiting fluid flow through the external device by terminating fluid communication between the second inlet and second outlet
   wherein the flow control means comprises;
   a bypass valve, rotatable between a first position in sealing engagement with the first seating surface and a second position in sealing engagement with the second seating surface.

2. The valve as defined in claim 1 including an actuator means comprising an axially movable member offset from the axis of rotation of the bypass valve and means connecting the axially movable member to the bypass valve for converting the axial motion of the member to rotary motion to rotate the bypass valve.

3. The valve as defined in claim 1 wherein the flow control means comprises
   actuator means operatively connected to the bypass valve for rotating same to the second position in response to a control signal;
   means for generating a bias force upon the bypass valve to maintain same in sealing engagement with the first seating surface below fluid flow rates less than a predetermined level and for permitting the bypass valve to rotate against the bias force, under the action of the fluid force generated by diverted fluid to regulate fluid flow at the first outlet at the predetermined level.

4. The valve as defined in claim 3 wherein the actuator means comprising an axially movable member offset from the axis of rotation of the bypass valve and means connecting the axially movable member to the bypass valve for converting the axial motion of the member to rotary motion to rotate the bypass valve.

5. The valve as defined in claim 4 wherein the actuator means includes the bias means, and wherein the bias means is coupled to the axially movable member to urge same in a direction to urge the bypass valve toward the first seating surface.

6. A fluid control valve comprising:
   a valve body defining a chamber and a bypass passage, for receiving fluid, extending therefrom,
   first conduit means, in fluid communication with the bypass passage, for defining a first inlet adapted to receive fluid and a first outlet adapted to communicate fluid to an external device;
   second conduit means, in communication with the chamber for defining a second inlet, adapted to receive flow from the external device, and a second outlet;
   the valve body further including a first seating surface, within the chamber, disposed about a downstream end of the bypass passage and a second seating surface disposed about the second inlet within the chamber;
   a bypass valve, rotatable between a first position in sealing engagement with the first seating surface and a second position in sealing engagement with the second seating surface;
   actuator means, operatively connected to the bypass valve for rotating same from the first position to the second position in response to control signals, and for generating a bias force upon the bypass valve to maintain same in sealing engagement with the first seating surface below fluid flow rates less than a predetermined level and for permitting the bypass valve to rotate against the bias force, under the action of the fluid force generated by diverted fluid to regulate fluid flow at the first outlet at the predetermined level.

7. The valve as defined in claim 6 wherein the first conduit means includes flow diverter means for urging fluid to flow into the bypass passage.

8. The valve as defined in claim 7 wherein the diverter means includes an arcuate shaped deflector extending from a wall of the first conduit means.

9. The valve as defined in claim 8 wherein the deflector terminates below and spaced from the opening of the bypass passage.

10. The valve as defined in claim 8 wherein the deflector is positioned upstream of the center of the bypass passage.

11. The valve as defined in claim 8 wherein the centerline of the first inlet is lower than the centerline of the first outlet.

12. The valve as defined in claim 6 wherein the bypass valve comprises hinge means, including a hinge pin, rotatable by the actuator means and first and second spaced resilient seals rotatable therewith for respectively engaging the first and second seating surfaces.

13. The valve as defined in claim 12 wherein the bypass valve further comprises:
a first member terminating at one end in an eyelet adapted to receive and rotate with the hinge pin, and wherein the first and second resilient seals are annular and secured about the first member.

14. The valve as defined in claim 13 wherein the actuator means is drivingly connected to one end of the hinge means and includes a spring for biasing the bypass valve toward the first seating surface and means for moving the bypass valve, against the force of the spring, into engagement with the second seating surface.

15. The valve as defined in claim 14 wherein the actuator means comprises an axially movable stem offset from the axis of rotation of the bypass valve and including connecting means, connecting an end of the stem to the hinge means, for converting the axial motion of the stem to rotary motion of the hinge means.

16. The valve as defined in claim 15 wherein one end of the hinge pin extends from the valve body, the connecting means comprises a bell lever interconnecting the stem and the hinge pin.

17. The valve as defined in claim 16 wherein the bell lever and hinge pin are of integral construction, the bell lever including an extending pivot member and wherein the one end of the stem includes an opening and resilient member for receiving the stem end and for securing the pivot member thereto.

18. The valve as defined in claim 15 wherein the actuator means includes a vacuum motor comprising a vacuum chamber including at one end thereof a flexible diaphragm, movable in a first direction, in response to a vacuum signal, and wherein the spring is located within the vacuum chamber, for urging the diaphragm in an opposite second direction, and wherein the stem is operatively secured to a stem and movable with the diaphragm.

19. The valve as defined in claim 12 wherein the hinge pin is received within a stepped bore, extending through the valve body to the chamber and an oppositely situated blind bore and wherein the hinge means includes a seal for fluidly sealing the hinge pin and stepped bore.

20. The valve as defined in claim 6 wherein the first inlet is substantially coaxial with the bypass passage.

* * * * *